Sept. 22, 1942.                K. B. DIEHL                2,296,505
                        CEMENT MIXER AND REGULATOR
                           Filed Jan. 9, 1941
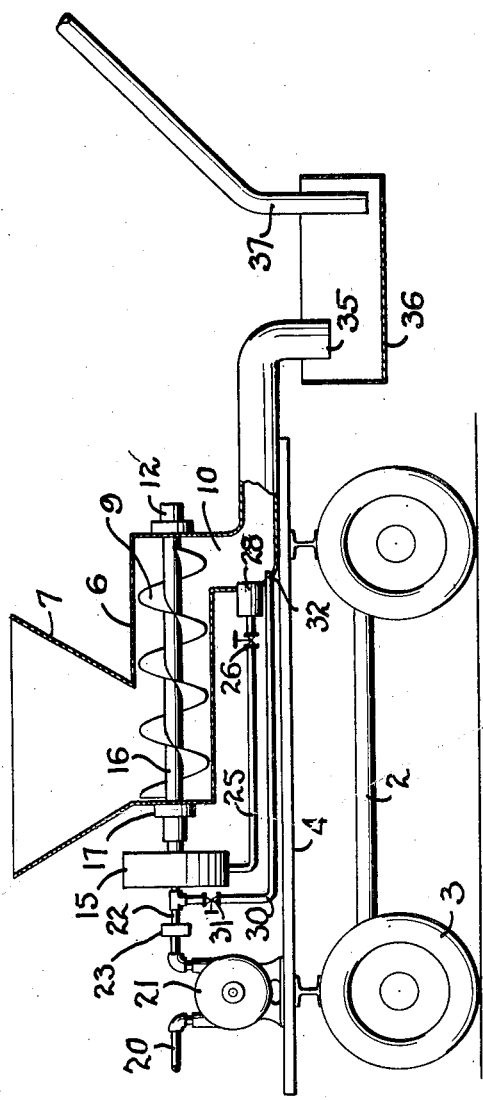
KENT B. DIEHL
       INVENTOR.
BY  Lester B. Clark.
           ATTORNEY.

Patented Sept. 22, 1942

2,296,505

UNITED STATES PATENT OFFICE 2,296,505

CEMENT MIXER AND REGULATOR

Kent B. Diehl, Houston, Tex., assignor to Halliburton Oil Well Cementing Company, Duncan, Okla.

Application January 9, 1941, Serial No. 373,715

2 Claims. (Cl. 259—165)

The invention relates to a cement mixer and regulator to be used where a neat cement or slurry is being mixed. An application of the invention would be in the mixing of cement to be introduced into a well bore in the various types of cementing operations therein. The invention has a particular application in combination with that structure and processes set forth in my prior copending application Serial No. 307,848, filed December 6, 1939, for a means and method of cementing wells. The invention of such application is directed to the transporting and use of cement in well cementing operations where the cement is transported in bulk as distinguished from the present practice of transporting the cement in sacks.

The advantages of what is now known as bulk cementing are more fully set forth in said application and the present invention adapts itself for use in combination with the bulk cementing operation in that a mixer and regulator are provided which will receive the cement from the vehicle in which the cement has been transported in bulk.

Generally, the present invention is intended to receive the bulk cement in a hopper and then mix and regulate the cement with water so that a uniform slurry will be produced.

It is one of the objects of the invention to provide a mixer and regulator wherein the volume of cement being fed through the device can be controlled by the flow of water so that the desired percentage of cement and water will be insured.

Another object of the invention is to provide a cement mixer and regulator wherein the volume of cement and water can be varied, metered and mixed as circumstances required.

Another object of the invention is to provide the cement feeding apparatus and the water which is to be mixed with the cement so that the cement will be fed in proportion with the amount of water and a uniform mix or slurry will result.

Another object of the invention is to provide a mixer wherein a screw conveyor is driven by a water motor which is actuated by the water to be mixed with the cement.

Another object of the invention is to provide a cement mixer and regulator with meters for the water and the cement and wherein the water and cement may be regulated in the desired proportions.

Still another object of the invention is to provide a mixer and regulator for a bulk cementing operation at a well bore.

Other and further objects of the invention will be readily apparent when the following description is considered in connection with the accompanying drawing wherein:

The single figure illustrates a side elevation of the mixer and regulator with certain parts in section to illustrate the arrangement thereof.

The drawing shows a vehicle 2 which may be mounted upon the wheels 3 and includes the frame 4. This frame is arranged to receive the screw conveyor housing 6 which carries a hopper 7 thereabove. This housing 6 is mounted on the frame 4 and has the screw conveyor 9 mounted therein for rotation so as to convey the dry cement from the hopper 7 to the discharge outlet 10. The conveyor may be arranged as desired so as to convey a predetermined volume of dry cement through the housing 6 and into the discharge 10 upon each revolution thereof. This may involve screw members having various pitches for the vane thereon so as to convey the desired amount. The cement may be fed to the hopper either from a bulk source or the cutter table may be mounted above the hopper if sack cement is used.

A meter illustrated diagrammatically at 12 can be attached to the housing 6 and calibrated so as to record the volume of cement passing through the device as the hopper 7 is maintained full of cement. This calibration may be in the form of either sacks, barrels or pounds, as desired.

In order to drive the screw 9, a water motor 15 is illustrated diagrammatically as being connected to the shaft 16 of the screw by means of a variable speed clutch 17. The clutch may be operated or set at the desired speed if a reduction or increase in the speed of shaft 16 relative to the motor 15 is desired.

The water motor may be operated by a source of water from the pipe 20 which may be forced into the motor by a pump 21 through the connection 22. A water meter 23 is provided so that the volume of water passing through the device can be recorded. A water discharge connection 25 leads from the motor 15 through a valve 26 to the connection 28 leading into the discharge conduit 10 of the mixer. This arrangement is provided so that the water from the motor 15 is introduced into the dry cement, and it seems obvious that by regulation of the parts, the exact proportions of water and cement can be introduced and the volume of cement will be proportional to the water because the water is used to drive the screw 9 for feeding the cement. The connection at 28 may be a jet type connection to jet the water into the cement, or the water may be allowed to flow freely into the discharge connection 10.

The valve 26 may be operated to control the flow as desired.

In some instances it may be desirable to by-pass a portion of the water around the motor 15 and into the discharge conduit 10. To this end a by-pass water pipe 30 carrying a valve 31 leads from the connection 22 into the conduit 10 where the water may discharge at 32 into the conduit.

It seems obvious from the foregoing that the mixer and controller can be adjusted and regulated so as to obtain any desired mix of cement and water, or, if desired, water only can be forced through the conduit 10.

The conduit 10 has a discharge opening at 35 leading into a sump or box 36 from which it may be picked up by the suction pipe 37 of the pump which is to convey the cement to the point of application.

Broadly, the invention contemplates a combination mixer and regulator wherein the amount of cement fed into the device is in proportion to the water which effects the feeding of the cement.

What is claimed is:

1. A cement mixer and regulator including a frame, a screw conveyor thereon, a hopper connected to said conveyor and adapted to receive dry cement to feed to said screw, a discharge conduit from said conveyor, a water connection, a meter therein to measure the flow of water, a water motor operated by the flow of water from said connection, a driving connection from said motor to said screw including, a variable speed clutch to control the rate of movement of said screw, a discharge connection from said motor to said discharge conduit so as to mix the water and cement to a slurry, and a cement meter to record the volume of cement being discharged by said screw.

2. A cement mixer and regulator including a frame, a screw conveyor thereon, a hopper connected with said conveyor and adapted to receive dry cement to feed to said screw, a discharge conduit from said conveyor, a water connection, a meter therein to measure the flow of water, a water motor operated by the flow of water from said connection, a driving connection from said motor to said screw including, a variable speed clutch to control the rate of movement of said screw, a discharge connection from said motor to said discharge conduit so as to mix the water and cement to a slurry, a cement meter to record the volume of cement being discharged by said screw, and a water by-pass line from ahead of said motor to said conduit to conduit water around said motor.

KENT B. DIEHL.